(12) United States Patent
Wigglesworth et al.

(10) Patent No.: US 12,001,837 B2
(45) Date of Patent: Jun. 4, 2024

(54) TWO-WAY SYNCHRONIZATION OF INFRASTRUCTURE-AS-CODE TEMPLATES AND INSTANCES

(71) Applicant: INTERNATIONAL BUSINESS MACHINES CORPORATION, Armonk, NY (US)

(72) Inventors: Joseph Paul Wigglesworth, Thornhill (CA); Miguel Angel Jimenez Achinte, Victoria (CA); Gabriel Tamura, Cali (CO); Hans Albert Muller, Victoria (CA); Ian Fraser Watts, Stouffville (CA); Hugh Edward Hockett, Apex, NC (US)

(73) Assignee: International Business Machines Corporation, Armonk, NY (US)

( * ) Notice: Subject to any disclaimer, the term of this patent is extended or adjusted under 35 U.S.C. 154(b) by 176 days.

(21) Appl. No.: 17/698,131

(22) Filed: Mar. 18, 2022

(65) Prior Publication Data
US 2023/0297366 A1    Sep. 21, 2023

(51) Int. Cl.
*G06F 8/30*       (2018.01)
*G06F 8/35*       (2018.01)
(Continued)

(52) U.S. Cl.
CPC .................. *G06F 8/70* (2013.01); *G06F 8/35* (2013.01); *G06F 8/36* (2013.01)

(58) Field of Classification Search
CPC ... G06F 8/35; G06F 8/36; G06F 8/355; G06F 8/70; G06F 8/751
See application file for complete search history.

(56) References Cited

U.S. PATENT DOCUMENTS

| 10,872,029 B1 | 12/2020 | Bawcom |
| 2017/0026416 A1 | 1/2017 | Carpenter |

(Continued)

OTHER PUBLICATIONS

Joel Scheuner et al., Cloud WorkBench—Infrastructure-as-Code Based Cloud Benchmarking, arXiv, 2014, pp. 1-8. Retrieved from Internet: <URL: https://arxiv.org/pdf/1408.4565.pdf>. (Year: 2014).*

(Continued)

*Primary Examiner* — Hanh Thi-Minh Bui
(74) *Attorney, Agent, or Firm* — Stosch Sabo

(57) ABSTRACT

Disclosed are techniques for two-way synchronization of infrastructure-as-code templates and instances, including a method comprising detecting changes to a run-time state of a system and, in response to detecting a change, triggering an update of a current run-time state model. The method may further comprise, in response to updating the run-time state model, comparing the updated model to a current model using a template in a local repository instantiated as the current model. The method may further comprise, in response to the comparison determining a structural difference between the updated model and the current model, merging the updated model and the current model into a new model; and updating a local clone of a repository of the template with the new model. The method may further comprise, in response to the comparison determining no structural difference between the updated model and the current model, pushing changes to a remote repository.

17 Claims, 14 Drawing Sheets

(51) Int. Cl.
*G06F 8/36* (2018.01)
*G06F 8/70* (2018.01)

(56) References Cited

U.S. PATENT DOCUMENTS

2020/0329464 A1* 10/2020 Madapoosi Sampath ............ H04L 41/0803
2021/0042096 A1 2/2021 White, III
2021/0103834 A1* 4/2021 Avadhanula ........ G06F 11/0793

OTHER PUBLICATIONS

Joel Scheuner et al., Cloud WorkBench—Infrastructure-as-Code Based Cloud Benchmarking, arXiv, Aug. 20, 2014, pp. 1-8. Retrieved from the Internet: <URL: https://arxiv.org/pdf/1408.4565.pdf>. (Year: 2014).*
"CloudFormation Template Generator", @ 2022 GitHub, Inc., Bayer-Group / cloudformation-template-generator, 16 pps., <https://github.com/MonsantoCo/cloudformation-template-generator>.
"Flame: Automatic Heat template generation", 5 pps., Powered by Gitea Version: v1.15.11 p. 92ms Template: 9ms, Copyright 2017 A Beautiful Site, LLC, <https://github.com/openstack/flame>.
"Google Cloud Deployment Manager documentation", 7 pps., Google Cloud, downloaded from the Internet on Mar. 8, 2022, <https://cloud.google.com/deployment-manager/docs/>.
"Heat Orchestration Template (HOT) specification", openstack., last updated: Mar. 5, 2020 22:30:58, 46 pps., <https://docs.openstack.org/heat/latest/template_guide/hot_spec.html>.
"Infrastructure as Code", By: IBM Cloud Education, IBM Cloud Learn Hub, Dec. 2, 2019, 9 pps., <https://www.ibm.com/cloud/learn/infrastructure-as-code>.
"Method and System to Integrate with External Services Using a Dynamic Dependency Model in Infrastructure As Code Systems", An IP.com Prior Art Database Technical Disclosure, IP.com No. IPCOM000257856D, 4 pps., IP.com Electronic Publication Date: Mar. 15, 2019, <https://priorart.ip.com/IPCOM/000257856>.
"What is AWS CloudFormation?", © 2022, Amazon Web Services, Inc. or its affiliates. All rights reserved., 2 pps., <https://docs.aws.amazon.com/AWSCloudFormation/latest/UserGuide/cfn-using-cloudformer.html>.
"What is Azure Resource Manager?", Feb. 4, 2022, 8 pps., Microsoft, <https://docs.microsoft.com/en-us/azure/azure-resource-manager/management/overview>.
"Write, Plan, Apply", 9 pps., Terraform, HashiCorp, Downloaded from the Internet on Mar. 8, 2022, <https://www.terraform.io/>.
Alonso et al., "PIACERE: Programming trustworthy Infrastructure As Code in a Secure Framework", 8 pps., downloaded from the Internet on Mar. 8, 2022, <http://ceur-ws.org/Vol-2878/paper2.pdf>.
Mell et al., "The NIST Definition of Cloud Computing", National Institute of Standards and Technology, U.S. Department of Commerce, NIST Special Publication 800-145, Sep. 2011, 7 pages.
"IBM Terraform provider", ManageIQ, © 2022 ManageIQ, 3 pps., <https://www.manageiq.org/docs/reference/latest/managing_providers/configuration_management_providers/ibm_terraform_provider.html>.

* cited by examiner

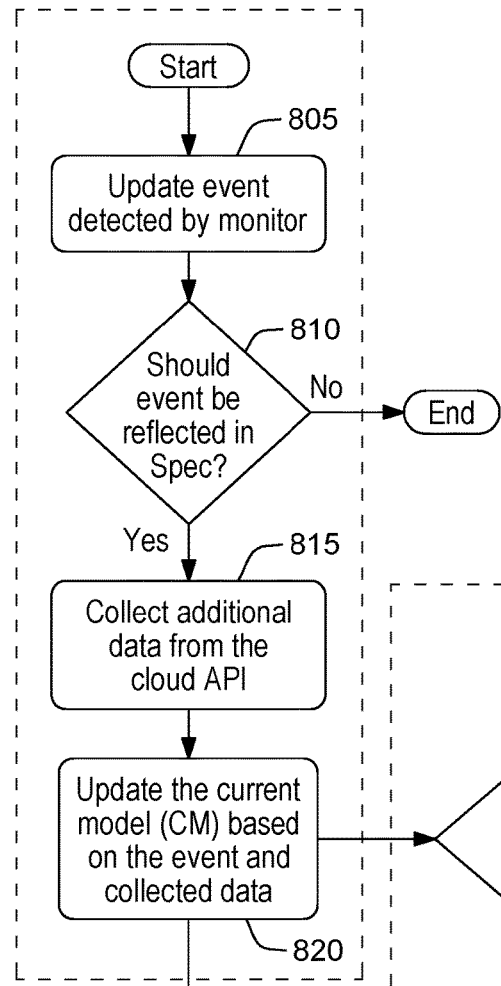
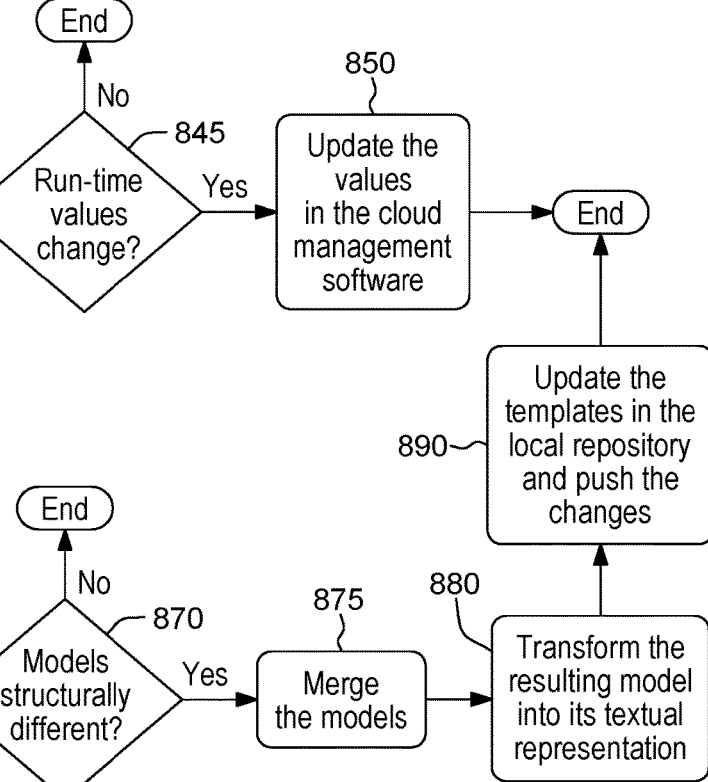
FIG. 8

```
variable "datacenter_1_name" {          ← Variable definitions
  type = "string"
}

...

provider "vsphere" {                    ← Data definitions
  allow_unverified_ssl = "${var.allow_unverified_ssl}"
  version              = "~> 1.3"
} data "vsphere_datacenter" "datacenter_1" {
  name = "${var.datacenter_1_name}"
}

...

resource "vsphere_virtual_machine" "vm_1" {
  datastore_id = "${data.vsphere_datastore.datastore_1.id}"
  folder       = "${var.vm_1_folder}"
  ...

clone {
    template_uuid = "${data.vsphere_virtual_machine.vm_1_template.id}"
    ..
    customize {
      dns_server_list = "${var.vm_1_dns_servers}"
      dns_suffix_list = "${var.vm_1_dns_suffixes}"
      ipv4_gateway    = "${var.vm_1_ipv4_gateway}"
      ...
    }
  }
  disk {
    label       = "${var.vm_1_disk_1_label}"
    size        = "${var.vm_1_disk_1_size}"         ← Resource definitions
    unit_number = "${var.vm_1_disk_1_unit_number}"
  } network_interface {
    adapter_type = "${var.vm_1_adapter_1_type}"
    network_id   = "${data.vsphere_network.network_1.id}"
  }
}
```

FIG. 10

```
resource_pool_1_name = Resources
vm_1_num_of_cores_per_socket = 1
vm_1_name = vm-1234
vm_1_number_cpus = 2
vm_1_adapter_1_type = VMXNET3
vm_1_scsi_type = lsilogic
vm_1_guest_os_id = UBUNTU_64
vm_1_disk_1_label = camc-vis232c-vm-121/camc-vis232c-vm-121.vmdk
vm_1_disk_1_size = 45
vm_1_disk_1_unit_number = 0
vm_1_memory = 1024 4096
vm_1_folder = group-v6700
network_1_interface_1_label = VIS232
datastore_1_name = CAM02-RSX6-002
datacenter_1_name = CAMDC2
```

FIG. 12

```
resource_pool_1_name = Resources
vm_1_num_of_cores_per_socket = 1
vm_1_name = vm-1234
vm_1_number_cpus = 2
vm_1_adapter_1_type = VMXNET3
vm_1_scsi_type = lsilogic
vm_1_guest_os_id = UBUNTU_64
vm_1_disk_1_label = camc-vis232c-vm-121/camc-vis232c-vm-121.vmdk
vm_1_disk_1_size = 45
vm_1_disk_1_unit_number = 0
vm_1_memory = 4096
vm_1_folder = group-v6700
network_1_interface_1_label = VIS232
datastore_1_name = CAM02-RSX6-002 CAM02-RSX6-001
datacenter_1_name = CAMDC2
```

FIG. 13

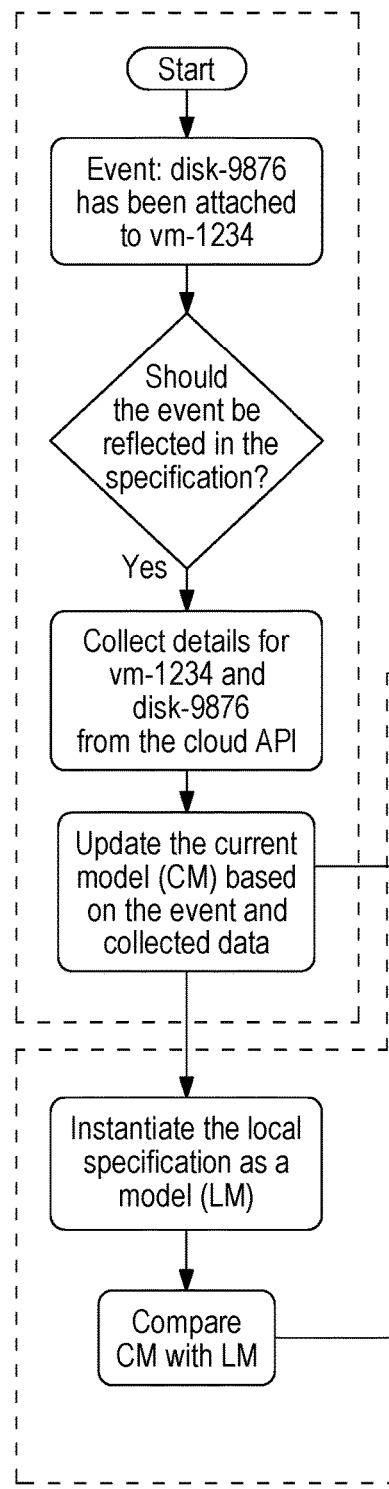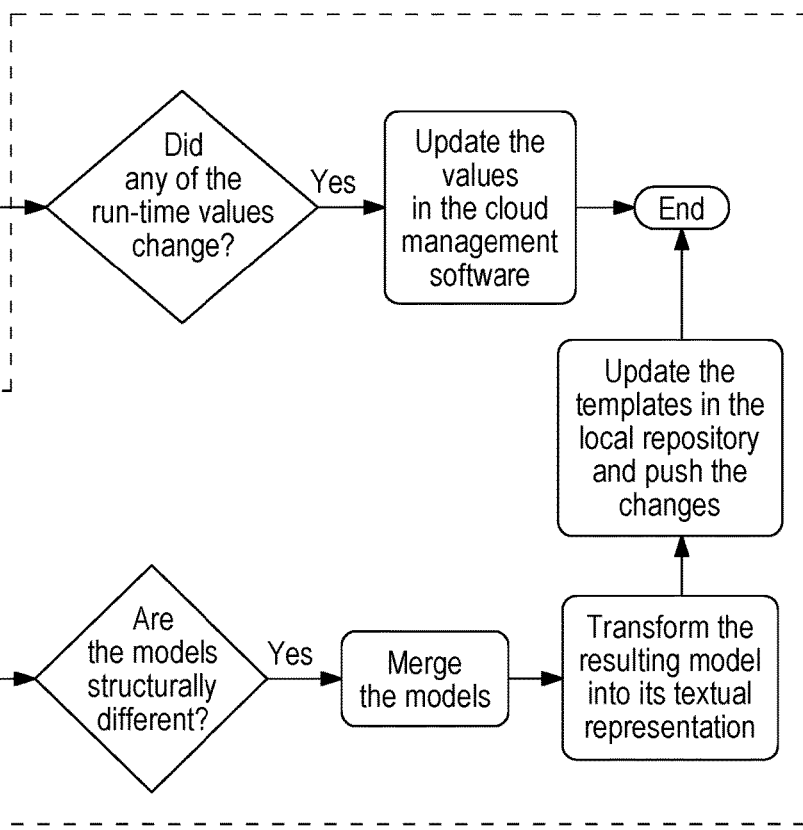
FIG. 14

```
+ variable "vm_2_disk_2_label" {
+   type = "string"
+ }

+ variable "vm_2_disk_2_size" {
+   type = "integer"
+ }

+ variable "vm_2_disk_2_unit_number" {
+   type = "integer"
+ }
...

resource "vsphere_virtual_machine" "vm_1" {
  datastore_id    = "${data.vsphere_datastore.datastore_1.id}"
  folder          = "${var.vm_1_folder}"
  ...
  disk {
    label       = "${var.vm_1_disk_1_label}"
    size        = "${var.vm_1_disk_1_size}"
    unit_number = "${var.vm_1_disk_1_unit_number}"
  }

+  disk {
+    label       = "${var.vm_1_disk_2_label}"
+    size        = "${var.vm_1_disk_2_size}"
+    unit_number = "${var.vm_1_disk_2_unit_number}"
+  }
  ...
}
```

FIG. 15

```
resource_pool_1_name = Resources
vm_1_num_of_cores_per_socket = 1
vm_1_name = vm-1234
vm_1_number_cpus = 2
vm_1_adapter_1_type = VMXNET3
vm_1_scsi_type = lsilogic
vm_1_guest_os_id = UBUNTU_64
vm_1_disk_1_label = camc-vis232c-vm-121/camc-vis232c-vm-121.vmdk
vm_1_disk_1_size = 45
vm_1_disk_1_unit_number = 0
vm_1_disk_2_label = camc-vis232c-vm-121/camc-vis232c-vm-121-2.vmdk      ⎤ New attributes
vm_1_disk_2_size = 50
vm_1_disk_2_unit_number = 1
vm_1_memory = 4096
vm_1_folder = group-v6700
network_1_interface_1_label = VIS232
datastore_1_name = CAM02-RSX6-002
datacenter_1_name = CAMDC2
```

FIG. 16

TWO-WAY SYNCHRONIZATION OF INFRASTRUCTURE-AS-CODE TEMPLATES AND INSTANCES

BACKGROUND

The present disclosure relates to Infrastructure-as-Code (IaC) methods and systems, and more specifically, to two-way synchronization of Infrastructure-as-Code templates and instances.

The development of the EDVAC system in 1948 is often cited as the beginning of the computer era. Since that time, computer systems have evolved into extremely complicated devices. Today's computer systems typically include a combination of sophisticated hardware and software components, application programs, operating systems, processors, buses, memory, input/output devices, and so on. As advances in semiconductor processing and computer architecture push performance higher and higher, even more advanced computer software has evolved to take advantage of the relatively higher performance of those capabilities, resulting in computer systems today that are more powerful than just a few years ago.

These increased capabilities, unfortunately, have been accompanied by increased complexity. Infrastructure as Code (IaC) is a set of systems and methods to reduce that complexity by automating management of those computer systems. Typically, IaC may provide a high-level descriptive coding language that allows system administrators automate the provisioning of information technology (IT) infrastructure, including the hardware, operating systems, database connections, storage, and other infrastructure elements.

IaC has subsequently evolved into an important DevOps tool, particularly in competitively paced software delivery organizations. IaC enables DevOps teams to rapidly create and version infrastructure in the same way they version source code, and to track these versions so as to avoid inconsistency among IT environments that can lead to serious issues during deployment.

SUMMARY

According to embodiments of the present disclosure, a computer-implemented method for two-way synchronization of infrastructure-as-code (IaC) templates, comprising detecting, by a run-time monitor, changes to a run-time state of a system. The method may further comprise, in response to detecting a change, triggering an update of a current run-time state model. The method may further comprise, in response to updating the run-time state model, comparing the updated model to a current model using a template in a local repository instantiated as the current model. The method may further comprise, in response to the comparison determining a structural difference between the updated model and the current model, merging the updated model and the current model into a new model; and updating a local clone of a repository of the template with the new model. The method may further comprise, in response to the comparison determining no structural difference between the updated model and the current model, pushing changes to a remote repository. In some embodiments, the run-time monitoring is performed during run-time state synchronization (RTSS) phase. In some embodiments, the change event comprises information to identify a resource and a type of modification. In some embodiments, the method may further comprise in response to a determination the change event did not provide sufficient information to perform an update, receiving additional information resulting from a request to an underlying cloud, and mapping the information and the additional information to the one or more transformation actions. In some embodiments, the method may further comprise, in response to the comparison determining a structural difference between models, converting the new model into a textual representation conforming to a notation model, and mapping concepts of the converted model and the notation to create a result file. In some embodiments, the method may further comprise, in response to a determination of no structural difference between models, converting the updated model into a set of input parameters containing current values, and performing an operation using the current values of at least one of updating the template instance and creating a new version in a template management software. In some embodiments, the update comprises mapping the change event to one or more transformation actions from a catalog of supported transformations associated with model-at-runtime (MART) instance updates.

A further aspect provides a computer program for implementing the method.

A further aspect provides a corresponding computer program product.

A further aspect provides a system for implementing the method.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

FIG. 8 is a flow chart illustrating one method of performing run-time updates in more detail, consistent with some embodiments.

FIG. 10 is an IaC specification for an illustrative example.

FIG. 12 is an IaC specification for the illustrative example.

FIG. 13 is an IaC specification for the illustrative example.

FIG. 14 is the flow chart of FIG. 8 as applied to the illustrative example.

FIG. 15 is an IaC specification for the illustrative example.

FIG. 16 is an IaC specification for the illustrative example.

Figure 1:
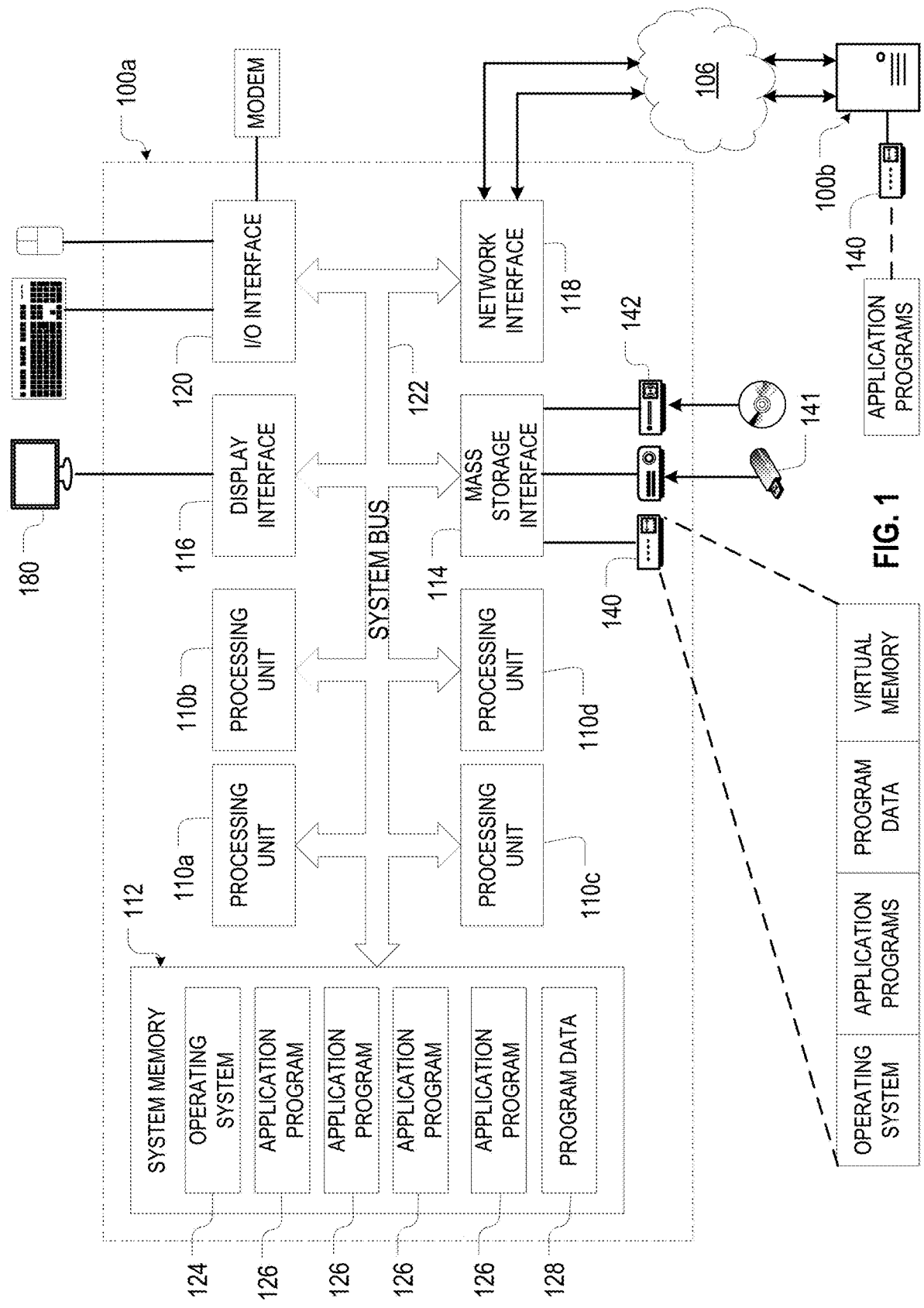
FIG. 1 illustrates one embodiment of a data processing system, consistent with some embodiments.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to Infrastructure-as-Code (IaC) methods and systems; more particular aspects relate to two-way synchronization of Infrastructure-as-Code templates and instances. While the present disclosure is not necessarily limited to such applications, various aspects of the disclosure may be appreciated through a discussion of various examples using this context.

Traditionally, provisioning IT resources was a time-consuming and costly process that required the physical setup of the hardware, installation and configuration of operating system software; connection to middleware, networks, and storage; etc., to be performed by expert personnel. Virtualization and cloud native development represent a partial improvement to the problem of physical hardware management, enabling developers to provision their own virtual servers or containers on demand. However, these solutions may still distract developers' focus off coding, may still require developers to repeat provisioning work for every new deployment, and may not track environment changes and/or prevent inconsistencies that impact deployments.

Infrastructure as Code (IaC) represents an improvement to such virtualization and cloud native development systems, enabling developers to effectively "order up" fully documented, versioned infrastructure by executing a script. The benefits of such IaC systems may include:

Faster time to production/market: IaC automation may speed the process of provisioning infrastructure for development, testing, and production (and for scaling or taking down production infrastructure as needed) by codifying and documenting all of the associated operations.

Faster, more efficient development: By simplifying provisioning and ensuring infrastructure consistency, IaC may accelerate every phase of the software delivery lifecycle. Developers can quickly provision sandboxes and continuous integration/continuous deployment (CI/CD) environments. QA can quickly provision full-fidelity test environments. Operations can quickly provision infrastructure for security and user-acceptance testing. And when the code passes testing, the application and the production infrastructure it runs on can be deployed in one step.

Protection against churn: To maximize efficiency in organizations without IaC, provisioning is typically delegated to a few skilled engineers or IT staffers. If one of these specialists leaves the organization, others are sometimes left to reconstruct the process. IaC can ensure that provisioning intelligence always remains with the organization.

Lower costs and improved ROI: IaC may let organizations take advantage of cloud computing's consumption-based cost structure. It may also enable developers to spend less time on plumbing and more time developing innovative, mission-critical software solutions.

IaC systems may be classified as having mutable or immutable infrastructure. Mutable infrastructure is infrastructure that can be modified or updated after it is originally provisioned. Mutable infrastructure can give development teams more flexibility to make ad hoc server customizations to, e.g., more closely fit development or application requirements or respond to an emergent security issue. But, mutable infrastructure may also undermine IaC's ability to maintain consistency between deployments or within versions, and can make infrastructure version tracking more difficult. Immutable infrastructure, in contrast, cannot be modified once originally provisioned. If new changes are required, the old infrastructure is deleted and new infrastructure is created.

Conventional IaC deployments may suffer from a number of problems. For example, despite the aforementioned benefits, organizations may resist migrating to IaC and associated cloud orchestration tools. This may be because these organizations have been managing their computing resources through in-house scripts and third-party command-line applications and administration portals, and the cost of duplicating that functionality in IaC can be significant. Additionally, manually writing the IaC specifications may result in functional bugs, some of which may become only visible once the infrastructure is in production.

Another problem is that, as IaC infrastructure changes are typically expected to start from the code specification, many organizations may have to discard a myriad of in-house scripts and third-party automation tools because those scripts and tools interfere with the IaC lifecycle, i.e., those changes should not target the running system, as doing so would leave the source specifications and the running system in an inconsistent configuration state. One possible approach is to adopt a forward-only development strategy to avoid configuration inconsistency. To guarantee configuration consistency in such an approach, any modification to the infrastructure would also be performed in the specifications. This approach ensures consistency between the running system and its deployment specifications, and at the same time allows change tracing.

Another problem is that many system administrators and DevOps engineers still follow a manual bug discovery and exploratory experimentation process to identify and fix faults. Deployment specifications in these organizations are the result of this incremental process, in which each step likely involves manual actions and inspections. Failing to update the specifications may lead to forms of technical debt including configuration drift, snowflake configurations, and erosion across environments.

Yet another problem is that many IaC deployments maintain separate IaC specifications (also referred to herein as templates) and instances. While such separation may allow members of the organization to tune and deploy the services they need, while the IT department can focus on maintaining the IaC specifications, it can mean that run-time changes can affect both, making it necessary to coordinate the evolution of independent instances and the template they share.

Accordingly, one aspect of this disclosure is a cloud management framework, which will be described with reference to a DevOps application. More specifically, some embodiments may comprise a model-driven, two-way continuous integration (CI) framework that synchronizes an IaC template (and its instances) with the target infrastructure. This framework may comprise four main components:

- a model-at-runtime (MART) instance that may represent the running environment (e.g., model representing the computing resources deployed to cloud management software);
- a notation-model mapping that may indicate how to transform the specification and the model instance to each other;
- the run-time semantics from the application domain to test instances of the model as part of the delivery pipeline, which may be expressed in the form of functional tests or constraints; and
- causal links to denote dependencies with other run-time models, allowing the propagation of changes from one model to its dependents (e.g., reconfiguring the cloud management software may cause a change propagation to a software deployment model if the latter depends on the former).

Another aspect of some embodiments is a method and system to automatically and continuously integrate (CI) run-time changes into a software evolution process. These embodiments may include two major components: (i) run-time state synchronization (RTSS); and (ii) automatic source specification update (ASSU). More specifically, a system's run-time state may be represented in a local model that lists all of its deployed resources, all the configuration parameters, and all of the relationships between the resources (i.e., an up-to-date snapshot of the computing infrastructure). Based on run-time changes to the system's state, the RTSS may compute a list of concrete actions to update the local model accordingly. The ASSU, in turn, may produce the necessary code statements to update the global IaC templates based on the system's run-time state. This may include automatically generating modifications to existing statements, such as resource definitions and comments. These new statements and modifications may be based on the latest changes to the computing infrastructure because the template's notation may also be represented as a run-time model (e.g., an abstract syntax tree) because transformations may be provided to instantiate each model from the other.

Another aspect of this disclosure is a model-based mechanism to update source IaC specifications based on run-time changes that can integrate with cloud orchestration software to support the lifecycle of IaC specifications. Additionally, some embodiments may provide continuous integration loop that considers autonomous agents as part of the software evolution, thus allowing smart online evolution.

Another aspect of the disclosure is a method for synchronizing IaC templates. One embodiment of the method may comprise a run-time state synchronization (RTSS) phase continuously performing run-time monitoring of infrastructure of a system to detect concrete changes to a run-time state of the system. The method may further comprise, in response to the run-time monitoring, detecting an event including information to identify a resource and a type of modification, triggering an update of a current run-time state model. The method may further comprise, in response to a determination the event itself did not provide sufficient information to perform an update, receiving additional information resulting from a request to an underlying cloud. The method may further comprise, in response to receiving the information and the additional information associated with the event, mapping the information and the additional information to one or more transformation actions from a catalog of supported transformations associated with model-at-runtime (MART) instance updates. The method may further comprise, in response to updating the MART to create an updated model, comparing the updated model to a current model using a template in a local repository instantiated as the current model. The method may further comprise, in response to a determination a structural difference between models, merging the models a new model. The method may further comprise converting the new model into a textual representation conforming to a notation model. The method may further comprise mapping concepts of the converted model and the notation to create a result file. The method may further comprise updating a local clone of a repository of the template. The method may further comprise, in response to a determination of structural difference, and the template was in fact updated, pushing changes to a remote repository. The method may further comprise converting the updated model into a set of input parameters containing current values. The method may further comprise performing an operation using the current values of at least one of updating a current template instance in the template management software and creating a new version in the template management software, depending on how the development team prefers to manage it.

Features and advantages of some embodiments may include:

Integration with the delivery pipeline: some embodiments may fully integrate run-time changes into the delivery pipeline, including automating tests, quality checks, and deployment via their extension of the CI concept. That is, these embodiments may work to maintain consistency between the specification and its runtime system realization as well as correctness of the modifications through functional tests and traceability of the modifications.

Use of third-party automation tools to update the system: some embodiments may remove the constraint of a single source of modifications discussed above. This means that system administrators and DevOps engineers can continue using their existing tools without worrying about configuration drift. These tools may include command-line applications, scripts, web management portals, and RESTful APIs.

An extensible approach based on models: some embodiments may be easily extended by meta-modeling the IaC concept. For example, both the target cloud and the specification notation can be replaced by introducing new IaC metamodels (and the corresponding model transformations) in some embodiments, and these changes may not affect the rest of the system.

Integration with IaC management tools: some embodiments may be designed to facilitate the integration of changes into third party IaC management tools, which may help maintain consistency among all the elements involved in the specification lifecycle.

Less configuration drift due to runtime variability on the execution environment. Such runtime variability may cause a mismatch the development and test, environments, which in turn, can result in issues at deployment, security vulnerabilities, and risks when developing applications and services that need to meet strict regulatory compliance standards.

Data Processing System (DPS)

FIG. 1 illustrates one embodiment of a data processing system (DPS) 100*a*, 100*b* (herein generically referred to as a DPS 100), consistent with some embodiments. FIG. 1 only depicts the representative major components of the DPS 100, and those individual components may have greater complexity than represented in FIG. 1. In some embodiments, the DPS 100 may be implemented as a personal computer; server computer; portable computer, such as a laptop or notebook computer, PDA (Personal Digital Assistant), tablet computer, or smartphone; processors embedded into larger devices, such as an automobile, airplane, teleconferencing system, appliance; smart devices; or any other appropriate type of electronic device. Moreover, components other than or in addition to those shown in FIG. 1 may be present, and the number, type, and configuration of such components may vary.

The DPS 100 in FIG. 1 may comprise a plurality of processing units 110a-110d (generically, processor 110 or CPU 110) that may be connected to a main memory 112, a mass storage interface 114, a terminal/display interface 116, a network interface 118, and an input/output ("I/O") interface 120 by a system bus 122. The mass storage interface 114 in this embodiment may connect the system bus 122 to one or more mass storage devices, such as a direct access storage device 140, a USB drive 141, and/or a readable/writable optical disk drive 142. The network interface 118 may allow the DPS 100a to communicate with other DPS 100b over a network 106. The main memory 112 may contain an operating system 124, a plurality of application programs 126, and program data 128.

The DPS 100 embodiment in FIG. 1 may be a general-purpose computing device. In these embodiments, the processors 110 may be any device capable of executing program instructions stored in the main memory 112, and may themselves be constructed from one or more microprocessors and/or integrated circuits. In some embodiments, the DPS 100 may contain multiple processors and/or processing cores, as is typical of larger, more capable computer systems; however, in other embodiments, the DPS 100 may only comprise a single processor system and/or a single processor designed to emulate a multiprocessor system. Further, the processor(s) 110 may be implemented using a number of heterogeneous data processing systems in which a main processor 110 is present with secondary processors on a single chip. As another illustrative example, the processor(s) 110 may be a symmetric multiprocessor system containing multiple processors 110 of the same type.

When the DPS 100 starts up, the associated processor(s) 110 may initially execute program instructions that make up the operating system 124. The operating system 124, in turn, may manage the physical and logical resources of the DPS 100. These resources may include the main memory 112, the mass storage interface 114, the terminal/display interface 116, the network interface 118, and the system bus 122. As with the processor(s) 110, some DPS 100 embodiments may utilize multiple system interfaces 114, 116, 118, 120, and buses 122, which in turn, may each include their own separate, fully programmed microprocessors.

Instructions for the operating system 124 and/or application programs 126 (generically, "program code," "computer usable program code," or "computer readable program code") may be initially located in the mass storage devices, which are in communication with the processor(s) 110 through the system bus 122. The program code in the different embodiments may be embodied on different physical or tangible computer-readable media, such as the memory 112 or the mass storage devices. In the illustrative example in FIG. 1, the instructions may be stored in a functional form of persistent storage on the direct access storage device 140. These instructions may then be loaded into the main memory 112 for execution by the processor(s) 110. However, the program code may also be located in a functional form on the computer-readable media, such as the direct access storage device 140 or the readable/writable optical disk drive 142, that is selectively removable in some embodiments. It may be loaded onto or transferred to the DPS 100 for execution by the processor(s) 110.

With continuing reference to FIG. 1, the system bus 122 may be any device that facilitates communication between and among the processor(s) 110; the main memory 112; and the interface(s) 114, 116, 118, 120. Moreover, although the system bus 122 in this embodiment is a relatively simple, single bus structure that provides a direct communication path among the system bus 122, other bus structures are consistent with the present disclosure, including without limitation, point-to-point links in hierarchical, star or web configurations, multiple hierarchical buses, parallel and redundant paths, etc.

The main memory 112 and the mass storage device(s) 140 may work cooperatively to store the operating system 124, the application programs 126, and the program data 128. In some embodiments, the main memory 112 may be a random-access semiconductor memory device ("RAM") capable of storing data and program instructions. Although FIG. 1 conceptually depicts the main memory 112 as a single monolithic entity, the main memory 112 in some embodiments may be a more complex arrangement, such as a hierarchy of caches and other memory devices. For example, the main memory 112 may exist in multiple levels of caches, and these caches may be further divided by function, such that one cache holds instructions while another cache holds non-instruction data that is used by the processor(s) 110. The main memory 112 may be further distributed and associated with a different processor(s) 110 or sets of the processor(s) 110, as is known in any of various so-called non-uniform memory access (NUMA) computer architectures. Moreover, some embodiments may utilize virtual addressing mechanisms that allow the DPS 100 to behave as if it has access to a large, single storage entity instead of access to multiple, smaller storage entities (such as the main memory 112 and the mass storage device 140).

Although the operating system 124, the application programs 126, and the program data 128 are illustrated in FIG. 1 as being contained within the main memory 112 of DPS 100a, some or all of them may be physically located on a different computer system (e.g., DPS 100b) and may be accessed remotely, e.g., via the network 106, in some embodiments. Moreover, the operating system 124, the application programs 126, and the program data 128 are not necessarily all completely contained in the same physical DPS 100a at the same time, and may even reside in the physical or virtual memory of other DPS 100b.

The system interfaces 114, 116, 118, 120 in some embodiments may support communication with a variety of storage and I/O devices. The mass storage interface 114 may support the attachment of one or more mass storage devices 140, which may include rotating magnetic disk drive storage devices, solid-state storage devices (SSD) that uses integrated circuit assemblies as memory to store data persistently, typically using flash memory or a combination of the two. Additionally, the mass storage devices 140 may also comprise other devices and assemblies, including arrays of disk drives configured to appear as a single large storage device to a host (commonly called RAID arrays) and/or archival storage media, such as hard disk drives, tape (e.g., mini-DV), writable compact disks (e.g., CD-R and CD- RW), digital versatile disks (e.g., DVD, DVD-R, DVD+R, DVD+RW, DVD-RAM), holography storage systems, blue laser disks, IBM Millipede devices, and the like. The I/O interface 120 may support attachment of one or more I/O devices, such as a keyboard, mouse, modem, or printer (not shown)

The terminal/display interface 116 may be used to directly connect one or more displays 180 to the DPS 100. These displays 180 may be non-intelligent (i.e., dumb) terminals, such as an LED monitor, or may themselves be fully programmable workstations that allow IT administrators and users to communicate with the DPS 100. Note, however, that while the display interface 116 may be provided to support communication with one or more displays 180, the DPS 100 does not necessarily require a display 180 because all needed interaction with users and other processes may occur via the network 106.

The network 106 may be any suitable network or combination of networks and may support any appropriate protocol suitable for communication of data and/or code to/from multiple DPS 100. Accordingly, the network interfaces 118 may be any device that facilitates such communication, regardless of whether the network connection is made using present-day analog and/or digital techniques or via some networking mechanism of the future. Suitable networks 106 include, but are not limited to, networks implemented using one or more of the "InfiniBand" or IEEE (Institute of Electrical and Electronics Engineers) 802.3x "Ethernet" specifications; cellular transmission networks; wireless networks implemented one of the IEEE 802.11x, IEEE 802.16, General Packet Radio Service ("GPRS"), FRS (Family Radio Service), or Bluetooth specifications; Ultra-Wide Band ("UWB") technology, such as that described in FCC 02-48; or the like. Those skilled in the art will appreciate that many different network and transport protocols may be used to implement the network 106. The Transmission Control Protocol/Internet Protocol ("TCP/IP") suite contains a suitable network and transport protocols.

Cloud Computing

Figure 2:
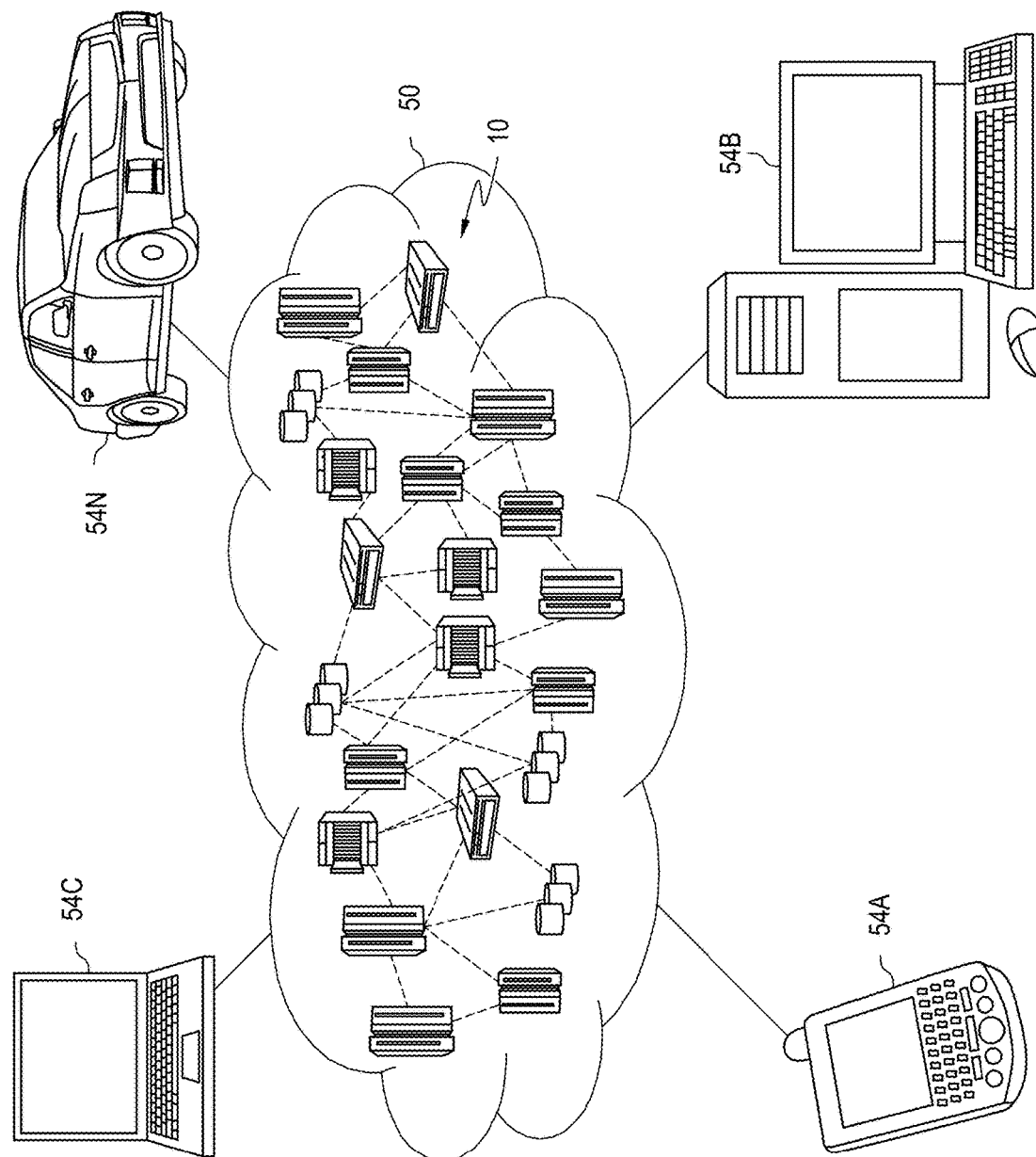
FIG. 2 illustrates one embodiment of a cloud environment comprising one or more DPS 100, consistent with some embodiments.

FIG. 2 illustrates one embodiment of a cloud environment comprising one or more DPS 100, consistent with some embodiments. It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 2, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
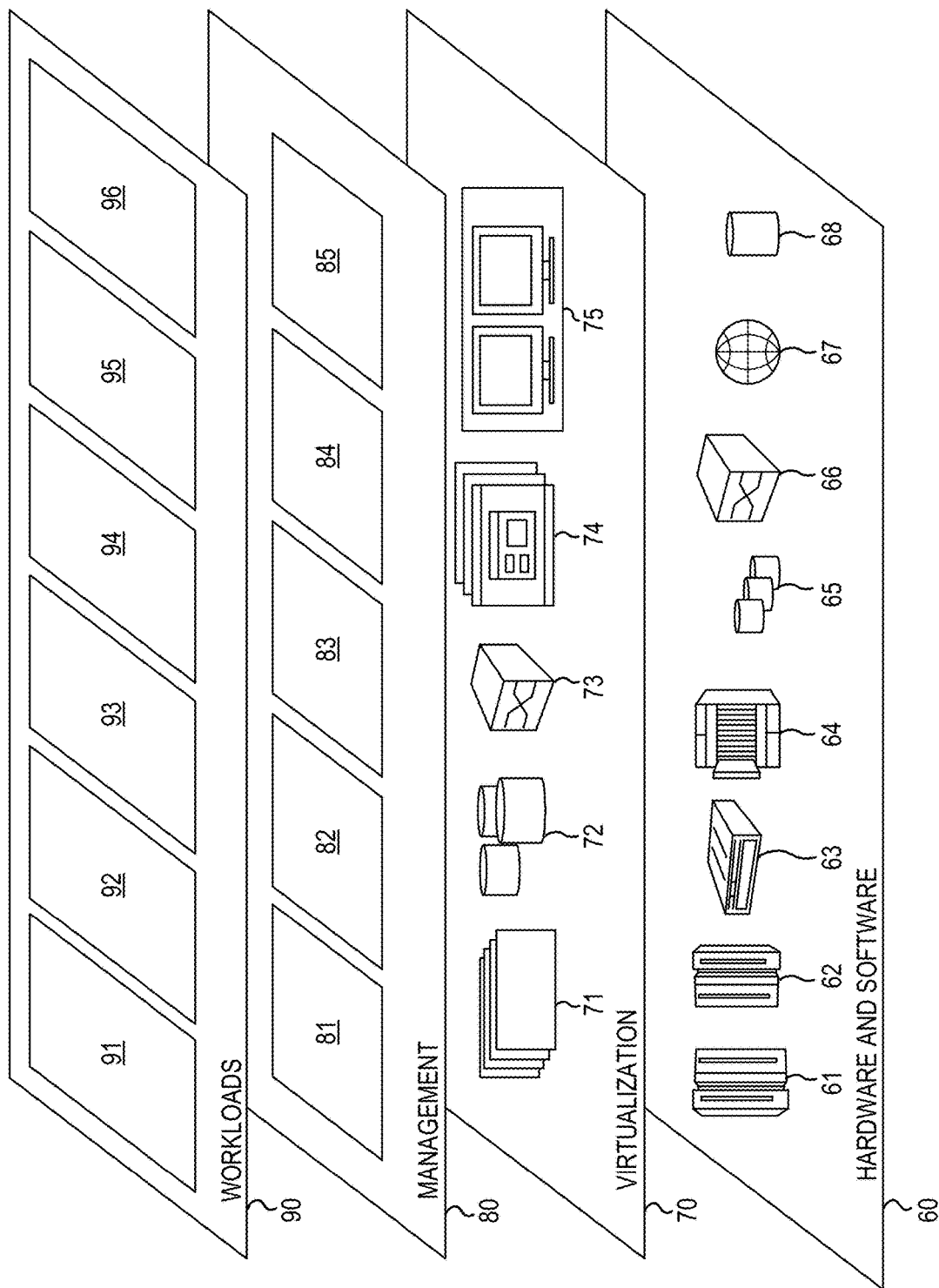
FIG. 3 shows a set of functional abstraction layers provided by a cloud computing environment, consistent with some embodiments.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and IaC code repository 96.

Cloud Management Framework

Figure 4:
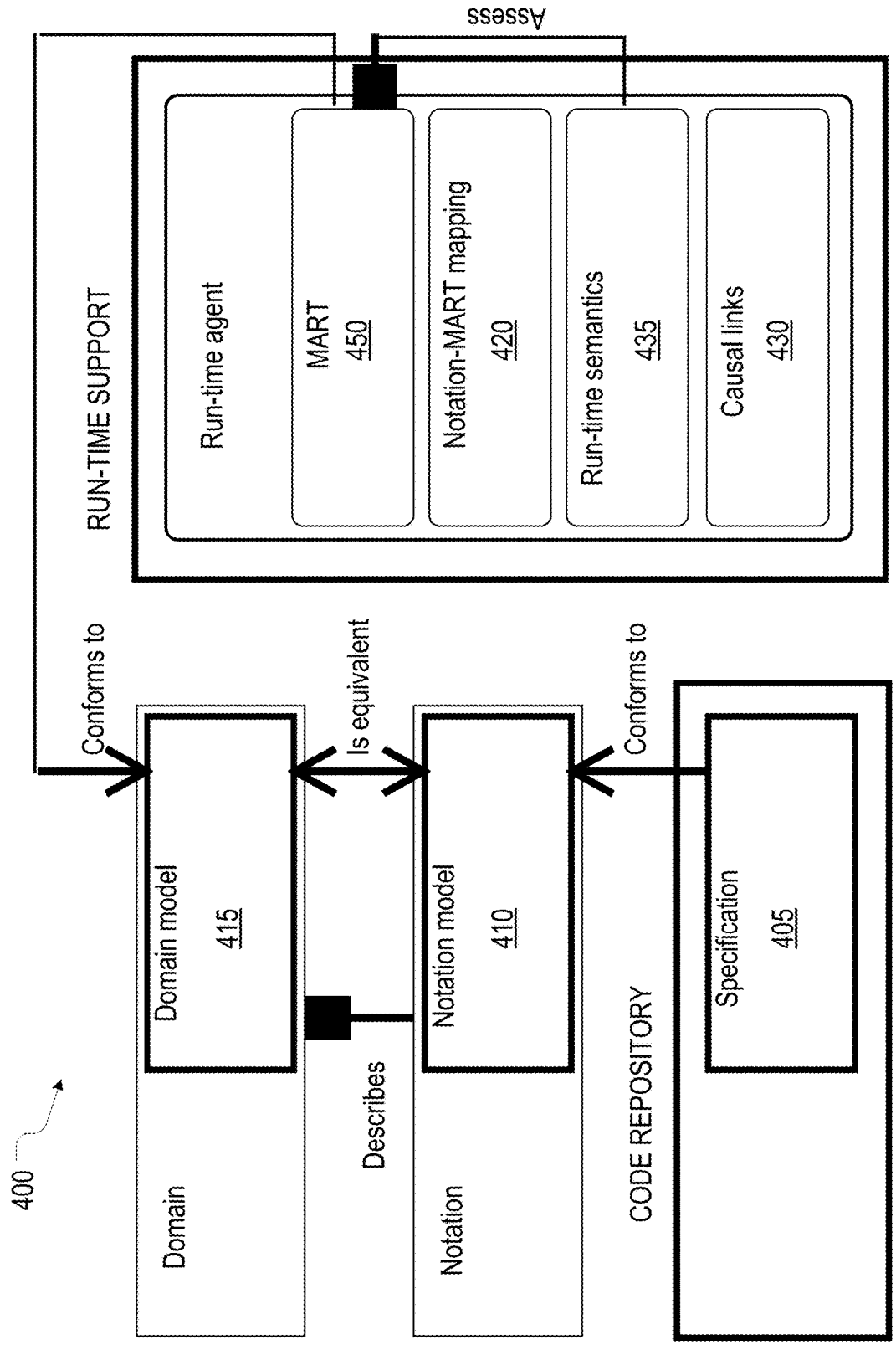
FIG. 4 is a system diagram of a framework for two-way synchronization of IaC templates and instances, consistent with some embodiments.

FIG. 4 is a system diagram of a framework 400 for two-way synchronization of IaC templates and instances, consistent with some embodiments. In this framework 400, an IaC specification 405 may conform to a notation model 410, which in turn, may be used to describe a domain model 415 specific for a particular vendor. To map the concepts from one model to another, a pair model-template 420 may be associated with a set of transformations. For example, an MART model 450 representing the networking domain may be set up to work with e.g., OpenStack Heat Orchestration Template (HOT) and/or HachiCorp Configuration Language (HCL). Each of these configurations, in turn, may contain methods to update the model instance and the template file, given a change in either one or both.

The run-time semantics of a run time agent 430 may be used in at least two ways. First, some embodiments may check a quality of the MART model 450 to guarantee its integrity. For example, a DevOps engineer may assign a computing resource an IP address outside its subnet range. A simple validation rule included in this example may discover this mistake and prevent deployment of that infrastructure element, thus offering quicker feedback and consuming fewer resources. Second, the run-time semantics 435 may allow for querying the MART model 450 about domain-specific concerns. These queries may replace some of the functional tests that require deploying computing resources for checking the quality of the specifications.

Figure 5:
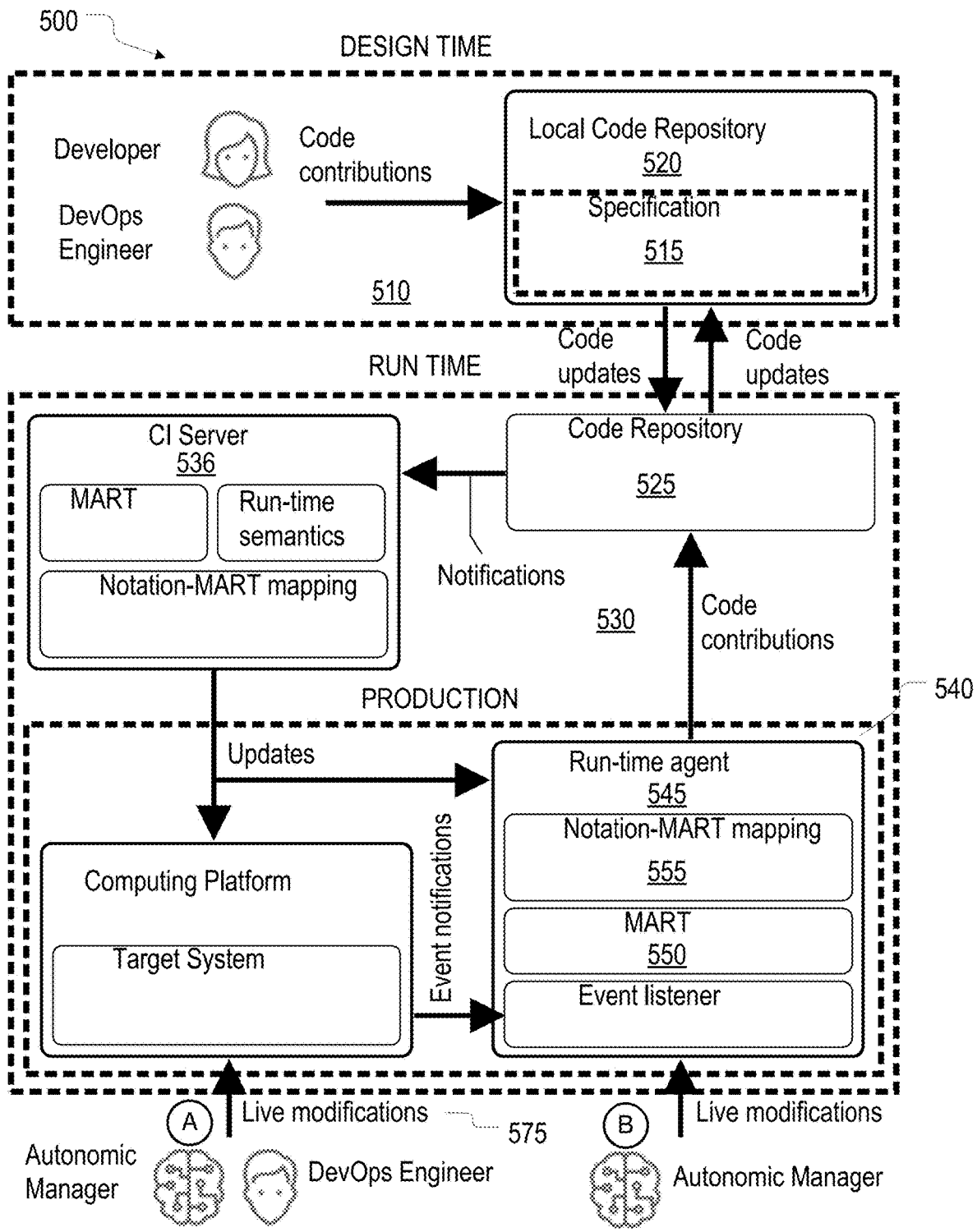
FIG. 5 is a flow chart illustrating a continuous integration (CI) loop, consistent with some embodiments.

FIG. 5 is a flow chart illustrating a continuous integration (CI) loop 500, consistent with some embodiments. The CI loop 500 may comprise a design phase 510 during which an IaC specification 515 may be developed and maintained in a local code repository 520. The loop 500 may also comprise a run time phase 530. The CI server 536, in turn, may comprise an MART 537, runtime-semantics 538, and a notation-MART mapping to test the IaC specification 515 and implement it onto actual hardware/software.

Initially, the IaC specification 515 may be used to provision a computing platform 535 having one or more target systems 540 using a CI server 536. During operation, a DevOps engineer and/or autonomic manager may change 575 one or more configuration settings on one or more of the target systems 540. In response, a run-time agent 545 executing on the production system may detect the changes using, e.g., event notifications and an event listener. As will be discussed in more detail below, these changes may be analyzed using the MART 550 and the notation-MART mapping 555 to generate code changes/contributions to the "code" of the IAC specification. These changes may be fed back into the local IaC specification in code repository 520, and then additionally fed back into global IaC code repository 525.

One feature and advantage of this embodiment is that the IaC specifications 515 may be treated in the same way as application code. This may allow manual changes to production machines to be automatically detected, integrated into the IaC specifications, and then replicated back to the developer-side infrastructure. Additionally, DevOps engineers and system administrators are not the only actors that may modify a running environment in this CI loop 500. For example, autonomic managers may have a significant role in understanding run-time operations. Dynamic scaling policies, for example, may automatically scale computing resources in response to changing service demands. The actions of these autonomic managers may not be generally reflected in the IaC specifications 515.

Figure 6:
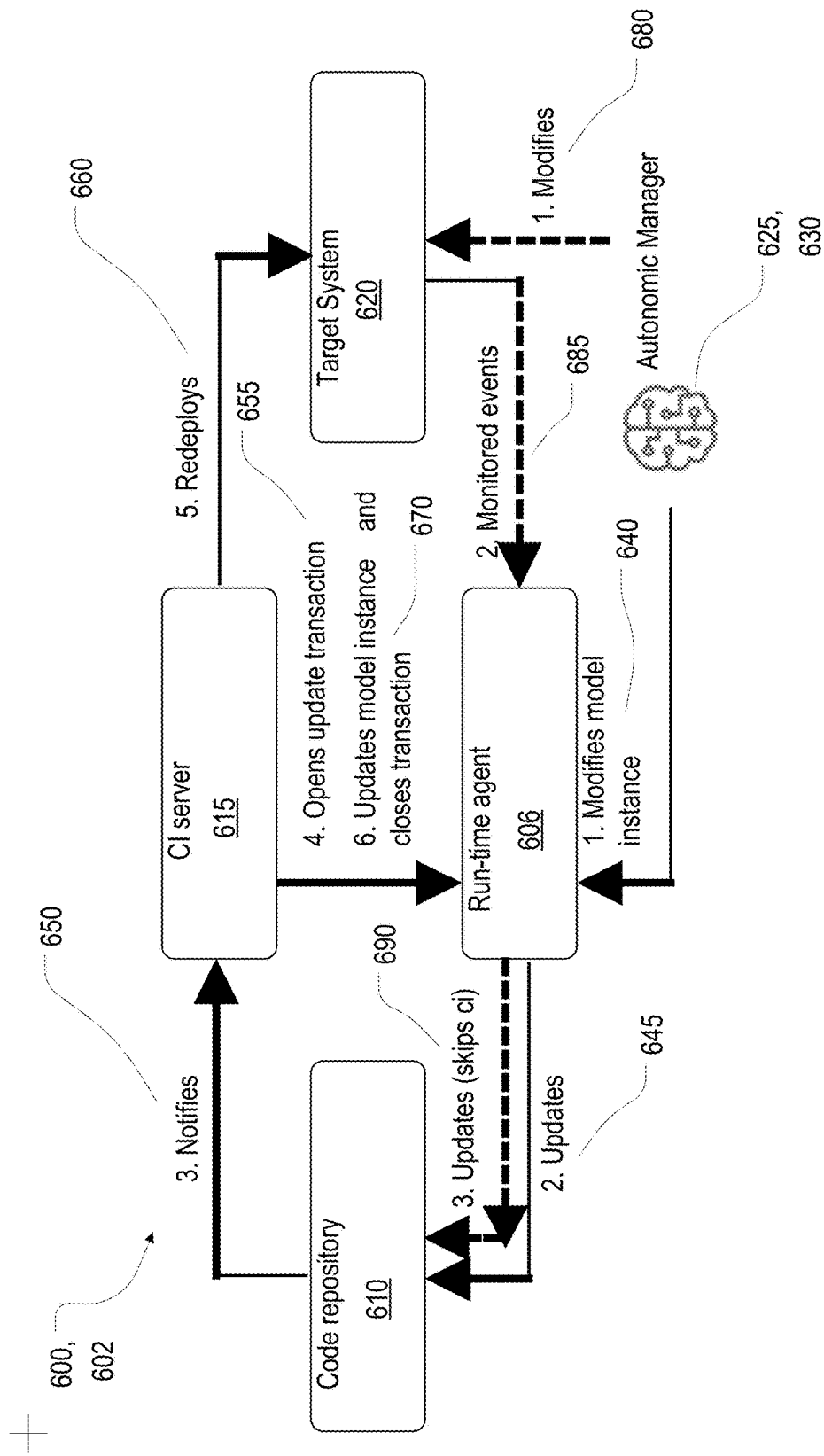
FIG. 6 is a flow chart showing two CI-aware automated software evolution methods, consistent with some embodiments.

FIG. 6 is a flow chart showing two CI-aware automated software evolution methods 600, 602, consistent with some embodiments. The embodiment in FIG. 6 is described with reference to two autonomic managers (625, 630) that represent the two ways of evolving an infrastructure system (e.g., cloud environment 50) from a run-time perspective. In method 1, autonomic manager 625 updates an IaC model instance at operation 640. This update may be detected by a run time agent 605 and then entered into a code repository 610 at operation 645. In method 1, this type of change may go through the CI pipeline describe with reference to FIGS. 4 and 5. This may include a notification operation 650 may being sent to a CI server 615 at operation 650. Once the autonomic manager has modified the model instance, the corresponding change may be committed and pushed. This may include opening an update transaction at operation 655 (e.g., to avoid partial updates during the deployment, with the corresponding artifacts of such a state), redeploying the change onto a target system 620 through the underlying infrastructure at operation 665, and then updating the model instance and closing the operation transaction at operation 670.

In method 2, the changes may skip the CI pipeline because it was already applied. In method 2, autonomic manager 630 may directly update the target system 620 at operation 680. The run-time agent 685 may detect that change at operation 685, generate corresponding code, and then update the code repository 610 at operation 690. Method 2 may be desirable for use in contextual situations demanding immediate response (e.g., quality of service is not being met) because this second method may limit or even avoid delays in the update process.

Figure 7:
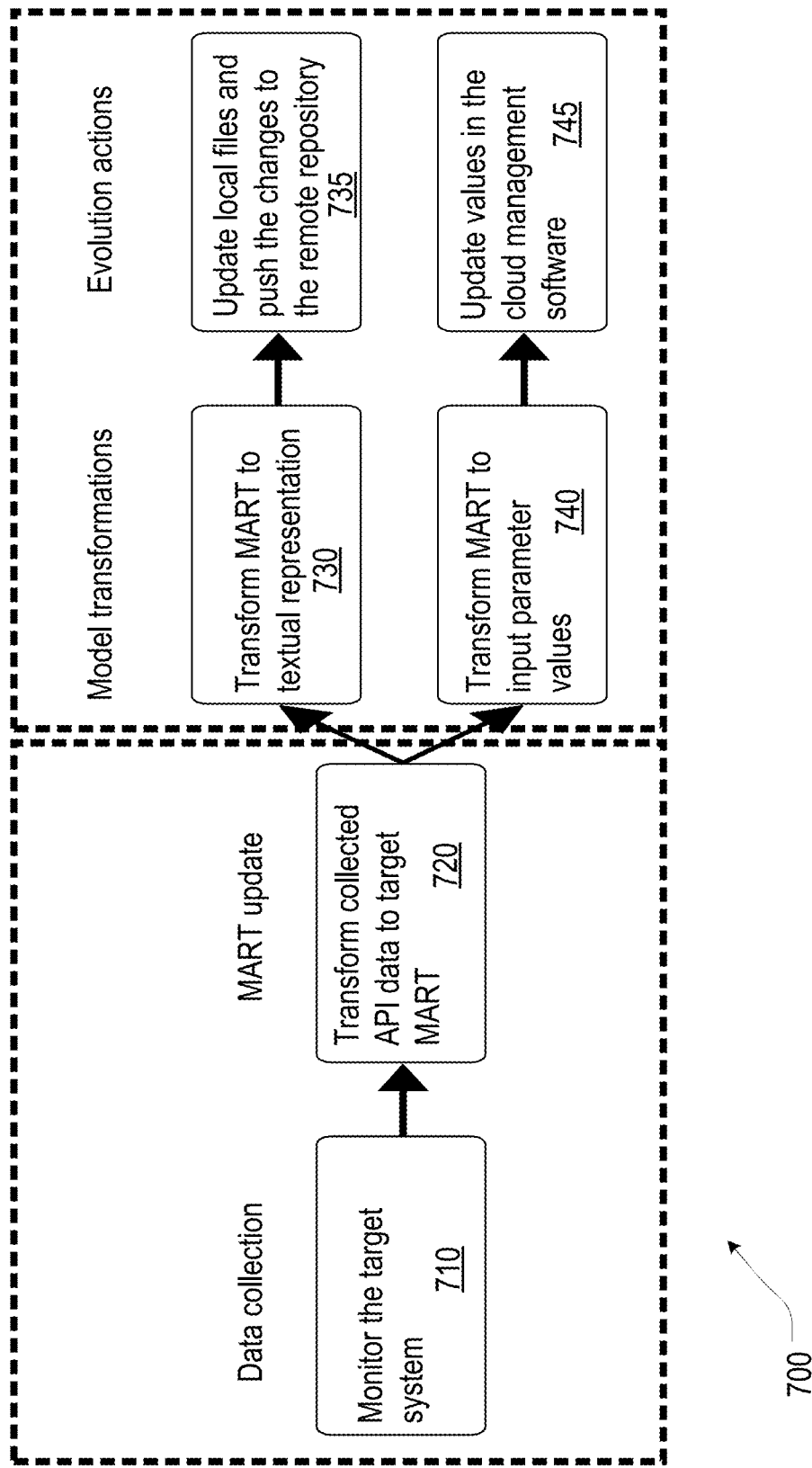
FIG. 7 is a simplified view of the data flow between the run-time state synchronization (RTSS) and the automatic source specification update (ASSU), consistent with some embodiments.

FIG. 7 is a simplified view of the data flow 700 between the RTSS and the ASSU, consistent with some embodiments. In particular, FIG. 7 shows how events/changes flow from run-time monitoring operations to concrete evolution actions. At operation 710, the target system may be continuously monitored for any changes. Whenever a computing resource is updated, the underlying cloud, operating system, hypervisor, local daemon, etc. may emit an event. The event may include information to identify the resource and the type of modification. Once an event is emitted, a monitor receives it and triggers an update for the current run-time state model. This may include transforming the collected information into a form suitable for the target MART at operation 720. The up-to-date model may be used to update parameter values in the template management software, as well as the template files in the associated code repository. More specifically, the target MART may be transformed to a textual representation at operation 730, which may be used to update local files and/or pushed back to the remote repository at operation 735. Additionally or alternatively, the target MART may be transformed to input parameter values at operation 740, and then used to update values in the cloud management software at operation 745.

FIG. 8 is a flow chart illustrating one method of performing run-time updates in more detail, consistent with some embodiments. In operation, the RTSS may be based on model-to-model transformations. As shown in FIG. 4 above, the MART and its notation share concepts from the domain. Therefore, any change on either side can be mapped to a transformation action from a catalog of supported transformations. This procedure can be abstracted into two operations: data collection and MART update. The data collection operation may rely on existing monitoring infrastructure to detect concrete changes to the system's run-time state. Below are some examples of possible monitoring events:

Virtual machine 1234 was migrated to another host
Virtual machine 1234's memory was increased
Disk 678's properties were updated
Disk 678 was attached to virtual machine 1234

Because virtual machine and disk may be concepts in the model, these events can be mapped to MART updates. Additionally, each of these events can be classified as a create, update or delete operation on the model instance. For example, a "create a new disk with a specific size and location"; "modify the size of an existing disk"; or simply "remove certain disk" may all be programmed as possible MART updates. In some embodiments, the event itself may not provide enough information to perform the update. Therefore, more information may be requested from the underlying cloud through its API. This additional data may refer to specific attributes that may be present in either the template or its instances, and may not be provided in the event itself.

Method 800 may begin at operation 805 by detecting an update event by monitor on one of the target machines. Next, the local MART determines whether or not that event should be reflected in the IaC specification. If not, then method 800 may end; otherwise flow proceeds to operation 815, where the RTSS may collect/request additional data from the cloud API. The RTSS may then update the current model (CM) based on the event and/or the collected data at operation 820.

Method 800 may then proceed to the automatic source specification update (ASSU). At operation 845, the ASSU may determine whether any of the run-time values have changed. If not, this branch of the flow may end, otherwise the ASSU may update the associated values in the cloud management software at operation 850. The flow from operation 820 may also proceed to operation 860 in some embodiments, where the ASSU may instantiate the local specification as a model (LM). The ASSU may then compare the CM model to the LM model at operation 865. The two models may be compared at operation 870. If they are the same, then this branch of the flow may end, otherwise, the ASSU may merge the two models at operation 875. The ASSU may then transform the resulting merged model into its textual representation at operation 880, and then may update the templates in the local repository and may push the changes back to the global code repository at operation 890.

Figure 9:
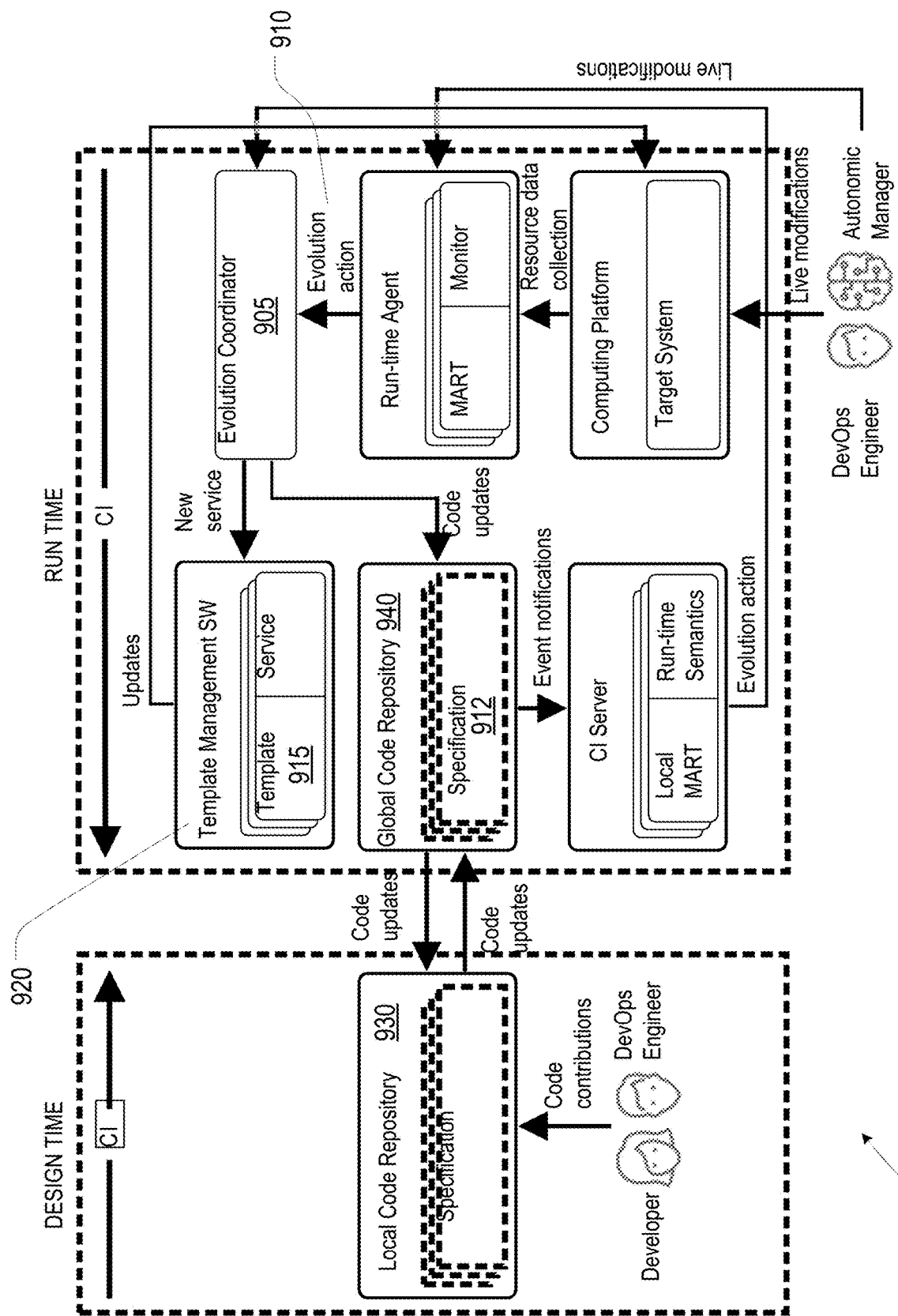
FIG. 9 is a diagram of a template management software system as part of the evolution lifecycle of IaC specification, consistent with some embodiments.

FIG. 9 is a diagram of a template management software system 900 as part of the evolution lifecycle of the IaC specification, consistent with some embodiments. In this embodiment, evolution happens through an evolution coordinator 905. The evolution coordinator 905 may receive a set of abstract evolution actions 910 (e.g., changes) to be executed. The evolution coordinator 905 may update the IaC specification 912 and may create a new version of the template instance 915 in the template management software 920. These updates are the result of two model transformations (see FIG. 7).

In operation, the updated model may first be compared to the current model. This may include ensuring that elements contributed by developers are not removed in the update, including non-functional notes and comments added by the developers. To conduct this comparison, the IaC template in the local repository 930 may be instantiated as a model (see FIG. 8). If the models are found structurally different, they may be merged into a new model. The new model may be converted into a textual representation that conforms to the notation model (see FIGS. 4 and 7). Because the model and the notation share concepts from the domain, they can be mapped on a concept by concept basis. The textual representation may be used to update the local clone of the template's repository. If no merge conflict is found and the template was in fact updated, the changes may be pushed to the global code repository 940. Next, the updated model may be converted into a set of input parameters containing current values. These values may be used to either update the template instance or to create a new version in the template management software system.

The evolution lifecycle depicted in FIG. 9 may consider the code repository as another source of change. This means that System Administrators and DevOps Engineers can modify the specification directly, as commonly practiced in IaC. Once the changes are committed, the CI server may propagate them through the evolution coordinator 905 to the management software and eventually to the target system.

Illustrative Example

FIGS. 10-16 are collectively an illustrative example of one embodiment in operation. This illustrative example assumes that a company is using the IaC tool together with a template management software. The company deploys its software services to a hybrid computing infrastructure running on a hypervisor. While most desired deployments will include a set of virtual machines (VMs) connected to a private virtual network, this example has been reduced to a single virtual machine for the sake of simplicity. Below are the variables for the bare minimum configuration in this illustrative example:

Datastore: The datastore where the disk will be stored
Disk size: The hard drive size
Folder: The folder where the VM will be located
Name: A unique name associated with the VM
Network: An existing network to which the machines will be connected
Cores per socket: The number of cores per socket
vCPUs: The number of virtual CPUs
Operating system: The base operating system
RAM: The amount of volatile memory
Resource pool: A resource pool associated with the VM
Virtual machine template and customizations: A custom configuration on top of the base operating system The variables for this virtual machine may be specified in an IaC template as is presented in FIG. 10. Those skilled in the art will recognize that, for clarity, FIG. 10 only provides a subset of the variables, providers, and data, and that other such information is within the scope of this disclosure. Moreover, specific values for input variables are provided in the instances rather than the template. Thus, the template can be reused.

The following operations represent a few sample runs of one embodiment of the disclosed system as an illustrative example.

Figure 11:
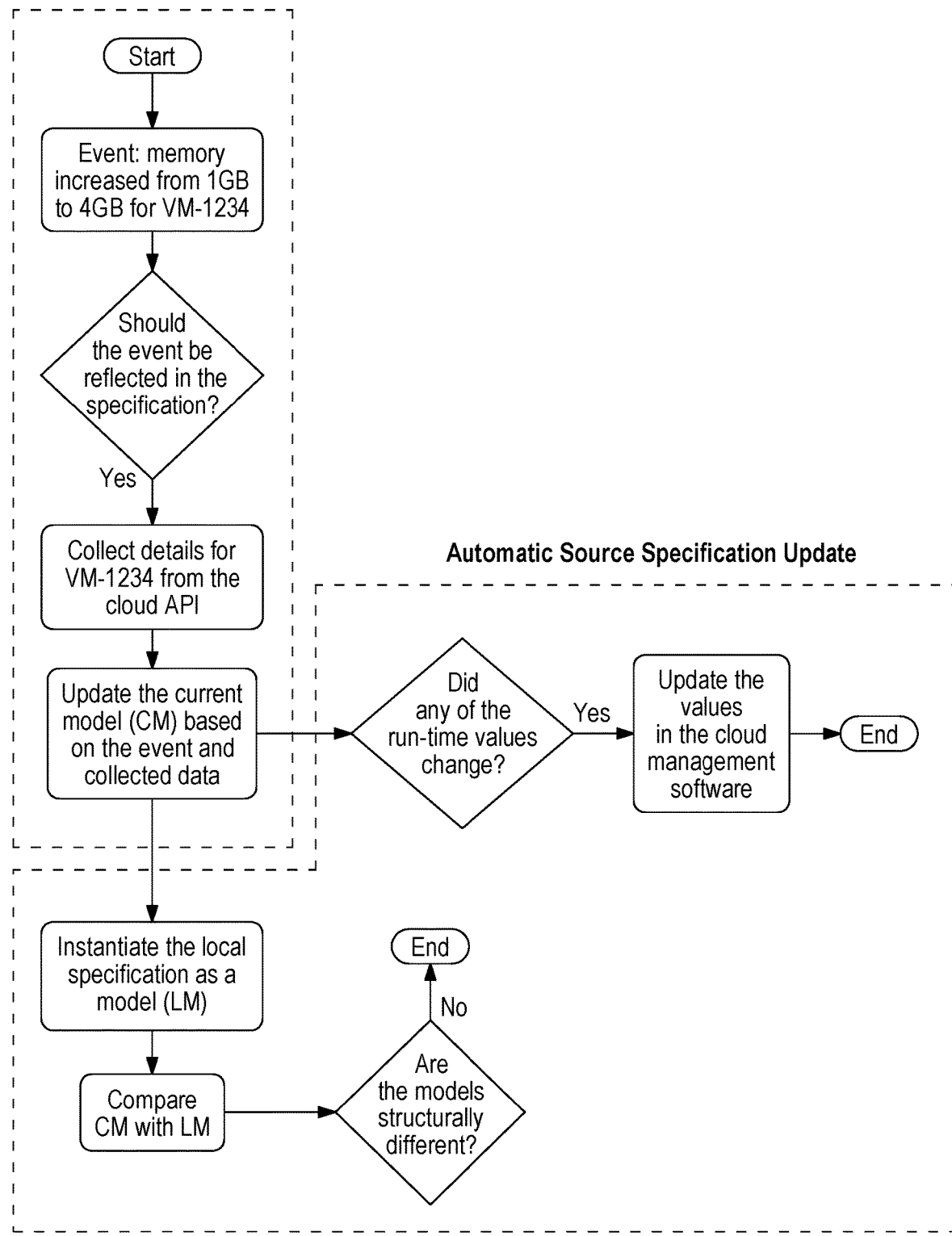
FIG. 11 is the flow chart of FIG. 8 as applied to the illustrative example.

Run No. 1
  Data collection
    Monitoring event: The memory for "virtual machine 1234" has been increased from 1 GB to 4 GB
  Model update
    Attribute memory from "virtual machine 1234" is updated to "4 GB."
  Model transformations
    As best shown in FIG. 11, the updated model in Run 1 may be compared to the model representing the local template. The two models in this example are recognized as equal because they are structurally the same. Therefore, a set of input parameters may be created, containing the parameter "memory=4 GB."
  Evolution actions
    The input parameters from the template instance are collected, and only one attribute is found to be different (i.e., the memory parameter). Therefore, the corresponding parameter of the IaC template instance is updated to "4 GB." The resulting modified parameters of the IaC template instance are shown in FIG. 12.
Run No. 2
  Data collection
    Monitoring event: The "virtual machine 1234" in this Run has been moved from datastore "CAM02-RSX6-002" to "CAM02-RSX6-001." The operations are the same as described with respect to Run No. 1 because this change also did not structurally change the IaC template. The resulting modified IaC is shown in FIG. 13.
Run No. 3
  Data collection
    Monitoring event: "Disk 9876" has been attached to "virtual machine 1234"
  Model update
    A new disk element is created in the model, and is associated with "virtual machine 1234"
  Model transformations
    As best shown in FIG. 14, the updated model is compared to the model representing the local template. They are recognized to be different; therefore they are merged and the resulting model is transformed into its textual representation.
  Evolution actions
    As also shown in FIG. 14, the textual representation of the model is used to create template files. The changes are committed and pushed to the remote repository (FIG. 15). The input parameters from the template instance may also be collected, and only three attributes are found to be different (and, in fact, are new). Therefore, they are created in the template management software. The template instance is shown in FIG. 16.

Computer Program Product

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a subsystem, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

General

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

Therefore, it is desired that the embodiments described herein be considered in all respects as illustrative, not restrictive, and that reference be made to the appended claims for determining the scope of the invention.

What is claimed is:

1. A computer-implemented method for two-way synchronization of infrastructure-as-code (IaC) templates, comprising:
    instantiating a current local run-time state model in a local repository using a template of a current global model;
    detecting, by a run-time monitor of a local computing system, a change event to a run-time state of the local computing system;
    in response to detecting the change event, triggering an update of the current local run-time state model, including transforming the change event into a form suitable for the local run-time state model;
    in response to updating the local run-time state model, comparing the updated local model to the current global model;
    in response to the comparison determining a structural difference between the updated local model and the current global model:
        merging the updated local model and the current global model into a new model;
        converting the new model into a textual representation conforming to a notation model;
        mapping concepts of the converted model and the notation model to create a result file; and
        updating a local clone of the template of the current global model using the result file;
    in response to the comparison determining no structural difference between the updated local model and the current global model, pushing changes to the global model to a remote repository.

2. The method of claim 1, wherein the run-time monitoring is performed during run-time state synchronization (RTSS) phase.

3. The method of claim 1, wherein the change event comprises information to identify a resource and a type of modification.

4. The method of claim 1, further comprising:
    in response to a determination the change event did not provide sufficient information to perform the update, receiving additional information resulting from a request to an underlying cloud; and
    mapping the information and the additional information to one or more transformation actions.

5. The method of claim 1, further comprising in response to a determination of no structural difference between models:
    converting the updated local model into a set of input parameters containing current values; and
    performing an operation using the current values of a local template instance and creating a new version in a template management software.

6. The method of claim 1, wherein the update of the current local run-time state model comprises mapping the change event to one or more transformation actions from a catalog of supported transformations associated with model-at-runtime (MART) instance updates.

7. A system for two-way synchronization of infrastructure-as-code (IaC) templates, the system comprising:
    one or more processors; and
    a memory communicatively coupled to the one or more processors;
    wherein the memory comprises instructions which, when executed by the one or more processors, cause the one or more processors to perform a method comprising:
        instantiating a current local run-time state model in a local repository using a template of a current global model;
        detecting, by a run-time monitor of a local computing system, a change event to a run-time state of the local computing system;
        in response to detecting the change event, triggering an update of the current local run-time state model, including transforming the change event into a form suitable for the local run-time state model;
        in response to updating the local run-time state model, comparing the updated local model to the current global model;
        in response to the comparison determining a structural difference between the updated local model and the current global model:
            merging the updated local model and the current global model into a new model;
            converting the new model into a textual representation conforming to a notation model;
            mapping concepts of the converted model and the notation model to create a result file; and
            updating a local clone of the template of the current global model using the result file;
        in response to the comparison determining no structural difference between the updated local model and the current global model, pushing changes to the global model to a remote repository.

8. The system of claim 7, wherein the run-time monitoring is performed during run-time state synchronization (RTSS) phase.

9. The system of claim 7, wherein the change event comprises information to identify a resource and a type of modification.

10. The system of claim 7, wherein the method further comprises:
    in response to a determination the event did not provide sufficient information to perform the update, receiving additional information resulting from a request to an underlying cloud; and
    mapping the information and the additional information to one or more transformation actions.

11. The system of claim 7, wherein the method further comprises in response to a determination of no structural difference between models:
    converting the updated local model into a set of input parameters containing current values; and
    performing an operation using the current values of a local template instance and creating a new version in a template management software.

12. The system of claim 7, wherein the update of the current local run-time state model comprises mapping the change event to one or more transformation actions from a catalog of supported transformations associated with model-at-runtime (MART) instance updates.

13. A computer program product for two-way synchronization of infrastructure-as-code (IaC) templates, the computer program product comprising a computer readable storage medium having program instructions embodied therewith, the program instructions executable by a computer to perform a method comprising:
    instantiating a current local run-time state model in a local repository using a template of a current global model;
    detecting, by a run-time monitor of a local computing system, a change event to a run-time state of the local computing system;

in response to detecting the change event, triggering an update of the current local run-time state model, including transforming the change event into a form suitable for the local run-time state model;

in response to updating the local run-time state model, comparing the updated local model to the current global model;

in response to the comparison determining a structural difference between the updated local model and the current global model:

merging the updated local model and the current global model into a new model;

converting the new model into a textual representation conforming to a notation model;

mapping concepts of the converted model and the notation model to create a result file; and updating a local clone of the template of the current global model using the result file;

in response to the comparison determining no structural difference between the updated local model and the current global model, pushing changes to the global model to a remote repository.

14. The computer program product of claim 13, wherein the run-time monitoring is performed during run-time state synchronization (RTSS) phase.

15. The computer program product of claim 13, wherein the method further comprises:

in response to a determination the change event did not provide sufficient information to perform the update, receiving additional information resulting from a request to an underlying cloud; and mapping the information and the additional information to one or more transformation actions.

16. The computer program product of claim 13, wherein the method further comprises in response to a determination of no structural difference between models:

converting the updated local model into a set of input parameters containing current values; and performing an operation using the current values of a local template instance and creating a new version in a template management software.

17. The computer program product of claim 13, wherein the update of the current local run-time state model comprises mapping the change event to one or more transformation actions from a catalog of supported transformations associated with model-at-runtime (MART) instance updates.

* * * * *